United States Patent [19]
McKinley

[11] 4,298,165
[45] Nov. 3, 1981

[54] CONTROLS FOR HEATING SYSTEM

[75] Inventor: Milton A. McKinley, Palisades Park, N.J.

[73] Assignee: Surgeonics Limited, Mount Kisco, N.Y.

[21] Appl. No.: 108,133

[22] Filed: Dec. 28, 1979

[51] Int. Cl.³ ............................................. F24D 3/00
[52] U.S. Cl. ................................. 237/8 R; 236/9 A; 236/46 F; 236/94; 165/11 R; 417/12
[58] Field of Search ............. 237/8 R; 236/9 A, 46 F, 236/94; 417/12; 165/11 R

[56] References Cited

U.S. PATENT DOCUMENTS

| | | | |
|---|---|---|---|
| 2,301,708 | 11/1942 | Roessler | 236/46 F |
| 4,019,677 | 4/1977 | Dotschkal et al. | 417/12 |
| 4,142,515 | 3/1979 | Skaats | 417/12 |
| 4,201,518 | 5/1980 | Stevenson | 417/12 |

FOREIGN PATENT DOCUMENTS 1384540  2/1975  United Kingdom ............... 237/8 R

*Primary Examiner*—Albert J. Makay
*Assistant Examiner*—Henry Bennett

[57] ABSTRACT

Apparatus for use in a heating system wherein an enclosed region is heated by hot water flowing through a heat exchanger disposed in the region, the hot water being supplied from a boiler heated by a furnace which is electrically actuated and deactuated, the water being circulated between the boiler and the heat exchanger by a circulator pump which is electrically actuated and deactuated, a thermostat being disposed in the space to control the temperature therein and including an electrical switch which is closed when additional heat must be supplied to the region and which is otherwise open. The apparatus employs a first arrangement for actuating said furnace and said pump when said switch is closed and for deactuating the furnace and the pump when the switch is open, a timer which is automatically reset, said timer when electrically actuated operating for a preselected time period and then is automatically deactuated, a second arrangement for actuating said pump and said timer when said first arrangement deactuates said furnace and pump, whereby said pump continues to circulate said water when said switch is open and said furnace is deactuated while said timer remains actuated, and a third arrangement for deactuating said pump when said timer is deactuated and said switch is open.

6 Claims, 1 Drawing Figure

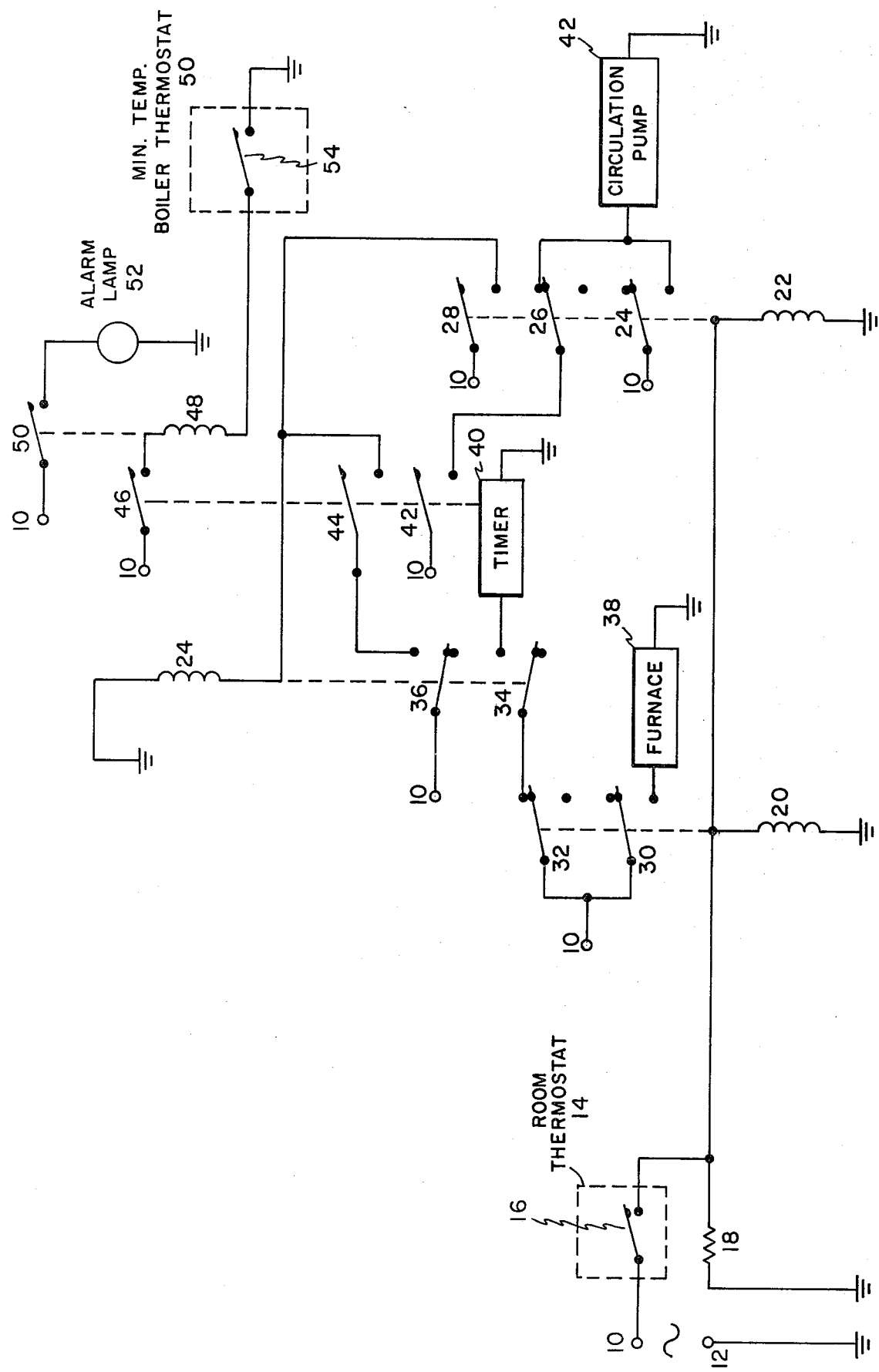

CONTROLS FOR HEATING SYSTEM

BACKGROUND OF THE INVENTION

In a conventional heating system, an enclosed region is heated by hot water circulated through a heat exchanger in the region. The water is heated in a boiler which in turn receives heat from a furnace in which oil, gas or other fuel is burned. A circulator pump circulates water from the boiler to the exchanger and back to the boiler. During the heating season, the water in the boiler is maintained between a minimum preselected temperature such as 100° F. and a maximum preselected temperature such as 190° F. When the region is heated, the requisite heat is supplied via the heat exchanger from the circulating hot water which is cooled accordingly. This cooled water is circulated back into the boiler for reheating prior to subsequent reuse. Thus additional heat is supplied via the boiler which in turn must continue to receive heat from the furnace. A thermostat in the region is used to turn both the circulator pump and furnace on at the same time when calling for heat and to turn the pump and furnace off at the same time when there is sufficient heat in the region and the thermostat is satisfied.

Since the water in the boiler has been maintained at a temperature during the heating circle which is well above the minimum temperature it will have cooled down slowly to the minimum temperature after the heating cycle is completed. During such cooling operation heat is lost and effectively wasted. This is a significant waste because the cost of the energy (fuel) used to produce the waster heat is significant and at the present time continually increasing.

The present invention is directed toward apparatus for controlling the operation of a heating system wherein the wasted heat previously described can be used to supply additional heat to the region. Thus, the previously wasted heat is converted to useful heat. This enables the system to deliver the same total heat to the region while substantially reducing the energy requirements and cost of operation.

SUMMARY OF THE INVENTION

The present invention is based in part upon the recognition that the previously wasted heat can be converted to useful heat in such manner as not to overshoot the total amount of heat delivered to the region, whereby overheating will not occur. The avoidance of overheating can be carried out in several ways as, for example, setting the temperature of the thermostat below the temperature actually desired, as, for example, setting a temperature of 65° F. when the temperature desired in the region is 68° F. or by electrically heating the thermostat by an external source such as a heat emitting electrical resistor disposed adjacent the thermostat so that the temperature measured by the thermostat increases more rapidly than the temperature in the region increases.

In either case, the thermostat deactuates the furnace when the thermostat is satisfied. The circulator pump, however, continues to be actuated for a selected period of time thereafter and circulates the water (which would otherwise be slowly cooling in the boiler) through the heat exchanger to supply the additional heat required to raise the temperature of the region to the desired value. Since this additional heat is the heat that would otherwise be wasted, the advantages of the invention are obtained.

The thermostat includes an electrical switch which is closed when additional heat must be supplied to the region and is otherwise open. In accordance with the invention, first means actuates both pump and furnace when the switch is closed and deactuates the pump and the furnace when the switch is open.

However, the invention also utilizes a timer which is automatically reset. The timer when electrically actuated operates for a preselected period of time and is then automatically deactuated.

Second means causes the pump and timer to be actuated when the first means deactuates the pump and furnace. The pump thus continues to circulate water, despite the fact that the furnace is deactuated, as long as the timer remains actuated. Third means deactuates the pump and discontinues the circulation when the timer is deactuated, provided that the switch is open at this time.

The period of operation of the timer will be varied, typically within the range of ten minutes to forty minutes, depending upon the amount of residual heat available and the rate of discharge of this heat into the region to be heated.

The invention can also incorporate a comparator coupled between a minimum temperature thermostat on the boiler and the timer to actuate an alarm signal such as a warning light when the temperature of the water in the boiler drops below the desired minimum and the timer is operating since it is obviously undesirable for the pump to continue circulating water when the heating system is not functioning properly.

BRIEF DESCRIPTION OF THE DRAWING

The accompanying FIGURE illustrates a preferred embodiment of the invention.

DETAILED DESCRIPTION OF PREFERRED EMBODIMENT

When room thermostat 14 calls for heat in the room, switch 16, which is heat sensitive, closes actuating relay windings 20 and 22 causing current to flow through heat producing resistor 18 disposed in heat radiating relationship with the thermostat and switch 16.

Normally open contacts 30 operated by winding 20 close, actuating the furnace whereby the boiler water is heated. Normally open contacts 24, 26 and 28 operated by winding 22 close whereby the circulation pump 42 is actuated circulating hot water through the heat exchanger in the room raising the temperature therein. At the same time relay winding 24 is actuated closing normally open contacts 36 and 34. Timer 40 is deactuated despite closure of contact 34 since normally open contacts 32 have been closed because of actuation of winding 20.

When the thermostat 14 is satisfied, switch 16 opens. As has been previously explained in general terms and as will be explained in more detail below, additional heat will be supplied to the room via the timer controlled pump. To avoid overheating, the heat radiated from resistor 18 has been used to cause switch 16 to open before the room temperature has actually reached the value established by the thermostat setting. The circulator will run for an additional period sufficient to supply enough additional heat to the room to raise the actual temperature to the desired value.

When switch 16 opens, windings 20 and 22 are deactuated. Normally open contacts 30 open, deactuating the furnace. Contacts 24, 26, 28 and 32 also open. This action removes the excitation voltage applied to the pump via contacts 24 and the excitation voltage applied to winding 24 via contacts 28. However, due to the inertia of the electromechanical properties of winding 24, its contacts 34 and 36 remain closed for a sufficient period to enable timer 24 to be actuated by application of excitation voltage via normally open contacts 32 and closed contacts 36. As soon as the timer is actuated switch contacts 42, 44 and 46 are closed.

Closure of contacts 42 applies an excitation voltage through normally open contacts 26 to the pump 42 which thus continues to be actuated even though winding 22 has been deactuated.

Closure of contacts 44 completes a holding circuit through contacts 36 for winding 24 whereby winding 24 remains actuated.

The pump thus continues to supply heat to the room. When timer 40 completes its preset cycle, contacts 44, 42 and 46 open. This action causes winding 24 to be deactuated whereby the timer is automatically reset and the circuit supplying energizing voltage to the pump is opened whereby the pump stops. At this point the proper amount of heat has been delivered to the room and the heating cycle has been completed.

The temperature of water in the boiler should be maintained at or above some preselected minimum temperature at all times. As a safety device, alarm lamp 52 will be energized if, while the timer is actuated and thus the pump is actuated, the boiler water temperature should fall below the minimum value. To accomplish this, the boiler is provided with thermostat 50 having switch 54. When the temperature of the water falls below the minimum, switch 54 closes. If, at the same time, the timer is actuated, switch contacts 46 are closed. These two actions actuate relay winding 48 causing normally open contacts 50 to close, energizing lamp 52. Thus winding 48, contacts 50 and lamp 52 form a comparator for comparing the operating conditions of timer and boiler and producing a warning signal if these conditions are improper.

The timer can be a synchronous motor responding to the sixty Hertz twenty four volt or one hundred and twenty volt single phase mains power normally employed to rotate through a selected number of revolutions before recycling. A manual control enables the desired number to be varied within a suitable range. The timer is constructed so as to cause its contacts to close when the timer is energized and to cause its contacts to open when it completes its cycle.

What is claimed is:

1. For use in a heating system obtaining electrical energy from a suitable source wherein an enclosed region is heated by hot water flowing through a heat exchanger disposed in the region, the hot water being supplied from a boiler heated by a furnace which is electrically actuated and deactuated, the water being circulated between the boiler and the heat exchanger by a circulator pump which is electrically actuated and deactuated, a thermostat being disposed in the space to control the temperature therein and including a first electrical switch which is closed when additional heat must be supplied to the region and which is otherwise open, apparatus comprising:

a minimum temperature thermostat for said boiler connected in circuit with the furnace to maintain the temperature of the water in the boiler at a selected minimum temperature, the minimum thermostat including a second electrical switch which is closed when the temperature of the boiler water is below said minimum and which is otherwise open;

first means for actuating said furnace and said pump when said first switch is closed and for deactuating the furnace and the pump when the first switch is open;

a timer which is automatically reset, said timer when electrically actuated operating for a preselected time period and then is automatically deactuated;

second means for actuating said pump and said timer when said first means deactuates said furnace and pump, whereby said pump continues to circulate said water when said first switch is open and said furnace is deactuated while said timer remains actuated;

third means for deactuating said pump when said timer is deactuated and said first switch is open;

alarm signal producing means; and a comparator coupled between the timer, the second switch and the alarm means to energize the alarm means when the timer is actuated and at the same time the second switch is closed.

2. Apparatus as set forth in claim 1 further including a heat emitting electrical resistor disposed adjacent said thermostat and connected in circuit with said source.

3. Apparatus as set forth in claim 2 wherein said first means includes first and second devices which are bistable and are characterized by first and second mutually exclusive electric states.

4. Apparatus as set forth in claim 3 wherein said second means includes a third device which is bistable and which is characterized by first and second mutually exclusive electric states.

5. Apparatus as set forth in claim 4 wherein each of said first second and third means is provided with a plurality of two position switches some of which are controlled by said devices, others of which are controlled by said timer.

6. Apparatus as set forth in claim 5 wherein said comparator includes a fourth bistable device characterized by first and second mutually exclusive electric states.

* * * * *